US 8,230,961 B2

(12) United States Patent
Schneidewind

(10) Patent No.: US 8,230,961 B2
(45) Date of Patent: Jul. 31, 2012

(54) ENERGY RECOVERY SYSTEMS FOR VEHICLES AND WHEELS COMPRISING THE SAME

(75) Inventor: Brian C. Schneidewind, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 373 days.

(21) Appl. No.: 12/612,246

(22) Filed: Nov. 4, 2009

(65) Prior Publication Data
US 2011/0100740 A1 May 5, 2011

(51) Int. Cl.
*B60K 6/30* (2007.10)
(52) U.S. Cl. .......................................... 180/165; 301/6.5
(58) Field of Classification Search .................. 180/165, 180/2.1, 65.21, 65.51, 65.6; 301/6.1, 6.5, 301/95.101, 95.104; 475/189, 190, 191
See application file for complete search history.

(56) References Cited

U.S. PATENT DOCUMENTS

| 1,691,625 | A | | 11/1928 | Chilton | |
|---|---|---|---|---|---|
| 3,387,683 | A | * | 6/1968 | Budzich | 180/165 |
| 4,282,947 | A | | 8/1981 | Kemper | |
| 4,583,505 | A | | 4/1986 | Frank et al. | |
| 4,591,016 | A | | 5/1986 | Matthews | |
| 4,679,646 | A | | 7/1987 | Greenwood | |
| 4,768,607 | A | | 9/1988 | Molina | |
| 4,779,485 | A | | 10/1988 | Dollison et al. | |
| 4,815,570 | A | * | 3/1989 | Tsuchida et al. | 188/181 A |
| 5,085,088 | A | | 2/1992 | Robinson et al. | |
| 5,244,054 | A | | 9/1993 | Parry | |
| 5,401,221 | A | | 3/1995 | Fellows et al. | |
| 5,564,998 | A | | 10/1996 | Fellows | |
| 5,591,281 | A | * | 1/1997 | Loewe | 152/418 |
| 5,597,056 | A | * | 1/1997 | Blake | 192/217.4 |
| 5,667,456 | A | | 9/1997 | Fellows | |
| 5,925,993 | A | | 7/1999 | Lansberry | |
| 5,931,249 | A | | 8/1999 | Ellis et al. | |

(Continued)

FOREIGN PATENT DOCUMENTS
GB 2460237 A 11/2009
(Continued)

OTHER PUBLICATIONS

Notice of Allowance mailed Feb. 7, 2012 as it relates to U.S. Appl. No. 12/627,209.

*Primary Examiner* — John Walters
(74) *Attorney, Agent, or Firm* — Dinsmore & Shohl LLP

(57) ABSTRACT

A wheel assembly for a vehicle may include a rim and an energy recovery system. The energy recovery system may include a flywheel and an infinitely variable transmission (IVT). The flywheel may be concentric with the rim and operable to rotate relative to the rim. The IVT may be positioned within the flywheel and couple the rim to the flywheel. When the vehicle is decelerating and an angular velocity of the rim is greater than an angular velocity of the flywheel, kinetic energy of the rim may be imparted to the flywheel and stored as mechanical potential energy thereby providing a braking force to the vehicle. Alternatively, when the vehicle is accelerating and the angular velocity of the rim is less than the angular velocity of the flywheel, the mechanical potential energy of the flywheel may be imparted to the wheel thereby providing an accelerating force to the vehicle.

20 Claims, 8 Drawing Sheets

U.S. PATENT DOCUMENTS

| | | |
|---|---|---|
| 6,009,365 A | 12/1999 | Takahara et al. |
| 6,073,712 A | 6/2000 | Buglione |
| 6,120,411 A | 9/2000 | Booth, Jr. |
| 6,170,587 B1 | 1/2001 | Bullock |
| 6,344,008 B1 | 2/2002 | Nagano et al. |
| 6,506,139 B2 | 1/2003 | Hirt et al. |
| 6,887,180 B2 | 5/2005 | Pels et al. |
| 6,935,987 B1 * | 8/2005 | Booth, Jr. ............ 476/4 |
| 7,160,226 B2 | 1/2007 | Fuller |
| 7,238,139 B2 | 7/2007 | Roethler et al. |
| 7,293,621 B2 | 11/2007 | Long |
| 7,416,039 B1 | 8/2008 | Anderson et al. |
| 7,540,346 B2 | 6/2009 | Hu |
| 7,624,830 B1 | 12/2009 | Williams |
| 2006/0145482 A1 | 7/2006 | Roethler et al. |
| 2006/0213703 A1 | 9/2006 | Long |
| 2008/0081724 A1 | 4/2008 | Ivantysynova et al. |
| 2009/0048054 A1 | 2/2009 | Tsuchiya et al. |
| 2009/0062065 A1 | 3/2009 | Field et al. |
| 2010/0184549 A1 | 7/2010 | Sartre et al. |
| 2011/0204650 A1 | 8/2011 | Dunne |
| 2011/0256972 A1 | 10/2011 | Greenwood |

FOREIGN PATENT DOCUMENTS

| | | |
|---|---|---|
| GB | 2466237 A | 6/2010 |
| GB | 2476676 B | 12/2011 |

* cited by examiner

ENERGY RECOVERY SYSTEMS FOR VEHICLES AND WHEELS COMPRISING THE SAME

CROSS REFERENCE TO RELATED APPLICATIONS

This specification is related to commonly assigned U.S. patent application Ser. No. 12/627,209 filed Nov. 30, 2009 entitled "ENERGY RECOVERY SYSTEMS FOR VEHICLES AND VEHICLE WHEELS COMPRISING THE SAME".

TECHNICAL FIELD

The present specification generally relates to systems for recovering the kinetic energy of a vehicle and, more specifically, to energy recovery systems comprising a flywheel coupled to a source of rotational motion with an infinitely variable transmission for vehicles and wheels for vehicles comprising the same.

BACKGROUND

Wheeled vehicles such as automobiles, trucks, motorcycles, trains, bicycles and the like have a considerable amount of kinetic energy when the vehicle is in motion. For example, the mass of the vehicle may generate a considerable amount of mechanical kinetic energy as the vehicle is propelled forward with an engine, electric motor or even human power. However, during braking, the excess kinetic energy of the vehicle is primarily dissipated as heat emitted from the braking system. Because the kinetic energy of the vehicle is dissipated instead of being recaptured and stored, the overall energy efficiency of the vehicle is low.

Various systems have been developed to recapture the kinetic energy of a vehicle as the vehicle decelerates. For example, some gas/electric hybrid automobiles incorporate electrical regenerative braking systems which capture the kinetic energy of the automobile (e.g., the rotation of the wheels) during deceleration and convert the kinetic energy to electrical energy which is stored in a battery as electrical potential energy. While regenerative braking systems may improve the overall energy efficiency of the vehicle by capturing and converting some of the vehicle's mechanical kinetic energy to electrical potential energy, the process of converting the mechanical kinetic energy to electrical potential energy is relatively inefficient.

Accordingly, a need exists for alternative systems for recovering and storing the kinetic energy of a vehicle as mechanical potential energy and returning the mechanical potential energy to the drive train of the vehicle to assist in vehicle propulsion.

SUMMARY

In one embodiment, a wheel assembly for a vehicle may include a rim and an energy recovery system. The energy recovery system may include a flywheel and an infinitely variable transmission (IVT). The flywheel may be substantially concentric with the rim and operable to rotate relative to the rim. The infinitely variable transmission may be positioned within the flywheel and couple the rim to the flywheel. When the vehicle is decelerating and an angular velocity of the rim is greater than an angular velocity of the flywheel, kinetic energy of the rim may be imparted to the flywheel and stored as mechanical potential energy thereby providing a braking force to the vehicle. Alternatively, when the vehicle is accelerating and the angular velocity of the rim is less than the angular velocity of the flywheel, the mechanical potential energy of the flywheel may be imparted to the wheel thereby providing an accelerating force to the vehicle.

In another embodiment, an energy recovery system may include a flywheel and an IVT. The IVT may rotationally couple the flywheel to a source of rotational motion with an input coupling. The IVT may also rotationally couple the flywheel to an external system with an output coupling. The IVT may comprise an idler ring, a plurality of input infinitely variable planetary gear sets (input IVPs) and a plurality of output infinitely variable planetary gear sets (output IVPs). The idler ring may be concentric with the flywheel. The plurality of input IVPs may be pivotally engaged with the outer diameter of the idler ring and operable to rotate on the outer diameter of the idler ring. The input IVPs may be rotationally coupled to the input coupling such that the rotation of the input coupling rotates the input IVPs on the outer diameter of the idler ring. The input IVPs may be operable to frictionally engage a flywheel coupling ring concentric with the flywheel and rotationally coupled to the flywheel such that rotation of the input IVPs around the idler ring may be imparted to the flywheel via the flywheel coupling ring. The plurality of output IVPs may be pivotally engaged with the inner diameter of the idler ring and operable to rotate on the inner diameter of the idler ring. The output IVPs may be rotationally coupled to the flywheel such that the rotation of the flywheel rotates the output IVPs on the inner diameter of the idler ring. The output IVPs may be operable to frictionally engage with an output coupling concentric with the flywheel such that rotation of the output IVPs is imparted to the output coupling. The idler ring may be axially displaceable with respect to the input IVPs and the output IVPs thereby pivoting the input IVPs and the output IVPs such that the input IVPs and the output IVPs are frictionally engaged or disengaged with the flywheel coupling ring and the output coupling, respectively.

In yet another embodiment, an energy recovery control system for a vehicle having at least one wheel assembly comprising a rim and an energy recovery system having a flywheel disposed in the rim and an infinitely variable transmission coupling the rim to the flywheel may include an electronic control unit electrically coupled to a brake sensor, an accelerator sensor and an IVT actuator. The brake sensor may be coupled to a braking system of the vehicle, the accelerator sensor may be coupled to a throttle control system of the vehicle and the IVT actuator may be coupled to the infinitely variable transmission. The electronic control unit may be programmed to: receive a signal from the brake sensor indicative of an amount of braking desired by a vehicle operator when the vehicle is decelerating; receive a signal from the accelerator sensor indicative of an amount of acceleration desired by the vehicle operator when the vehicle is accelerating from a stop; and output a control signal to the IVT actuator to engage the infinitely variable transmission with the flywheel and the rim based on one of the signal from the brake sensor or the signal from the accelerator sensor when the vehicle is accelerating from a stop or decelerating.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
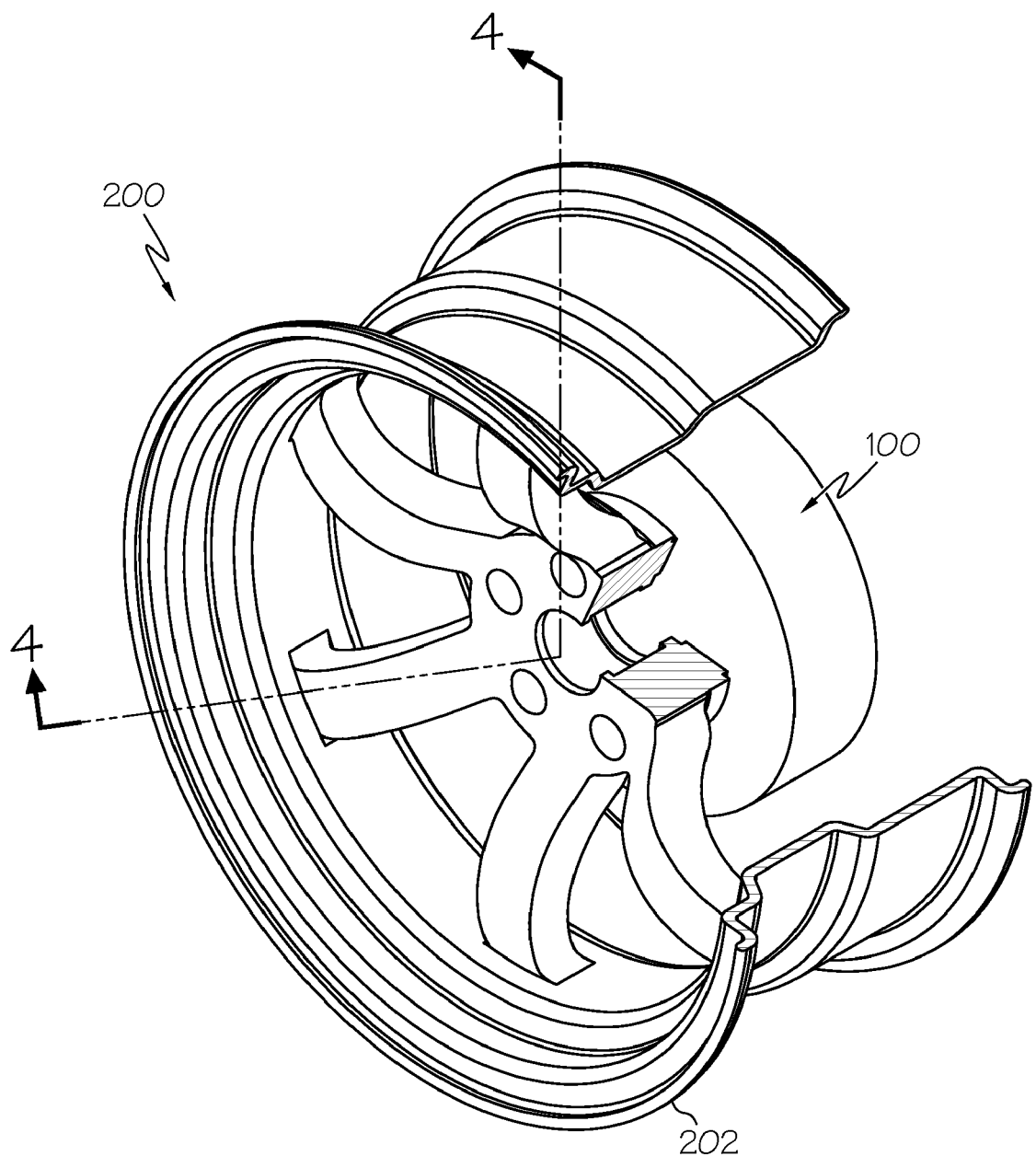
FIG. 1 depicts a wheel with an energy recovery system according to at least one embodiment shown and described herein.

FIG. 1 depicts a wheel assembly for a vehicle which comprises an energy recovery system according to one embodiment described herein. The energy recovery system may generally comprise an infinitely variable transmission rotationally coupled to a flywheel. The infinitely variable transmission may comprise an input and an output rotationally coupled to a source of rotational motion such as a vehicle wheel. Depending on the relative angular velocities of the flywheel and the source of rotational motion, the infinitely variable transmission may be operable to either impart the rotational motion of the source to the flywheel (i.e., store the mechanical kinetic energy of the source as mechanical potential energy) via the infinitely variable transmission or impart the rotational motion of the flywheel to the source (i.e., utilize the stored mechanical potential energy to do useful work on the source) via the infinitely variable transmission. Various embodiments of energy recovery systems and wheels and vehicles utilizing the energy recovery systems will be described in more detail herein.

Referring to FIG. 1, a wheel assembly 200 for use in conjunction with a vehicle is illustrated. The wheel assembly 200 generally comprises a rim 202 which is rotationally coupled to an energy recovery system 100. In the embodiment shown in FIG. 1, the energy recovery system 100 is at least partially disposed within the wheel and is substantially coaxial with the axis of rotation of the wheel. The energy recovery system 100 will be described in more detail with reference to FIG. 2.

Figure 2:
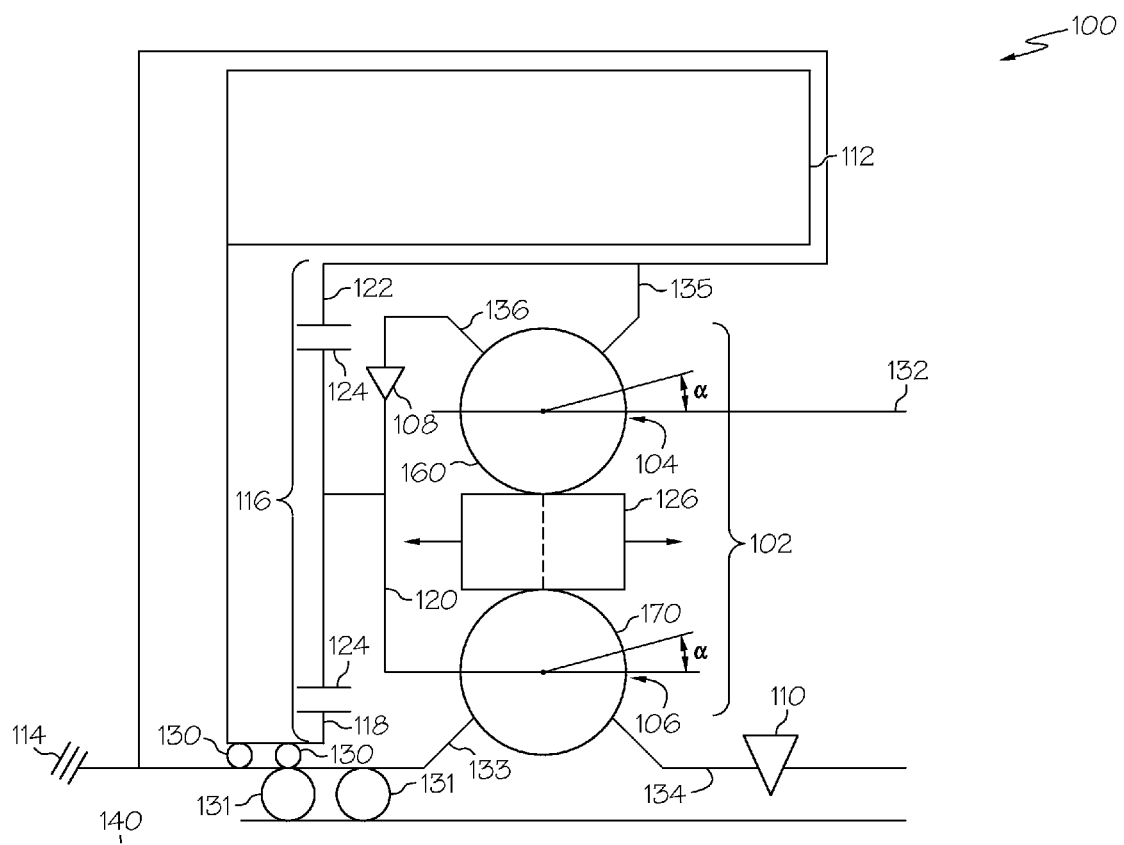
FIG. 2 is a schematic diagram of a partial cross section of an energy recovery system according to one or more embodiments shown and described herein.

Referring now to FIG. 2, a schematic of a partial radial cross section of the energy recovery system 100 is depicted relative to the axis of rotation 140 of the energy recovery system. The energy recovery system 100 may generally comprise a housing (not shown) in which an infinitely variable transmission (IVT) 102 and a flywheel 112 may be positioned. The IVT 102 and flywheel 112 may be rotationally coupled to one another, as will be described in more detail herein. The housing may be filled with a fluid, such as a traction fluid, which lubricates the rotating parts of the energy recovery system 100 and also facilitates mechanically coupling the rotating parts of the energy recovery system. In the embodiments of the energy recovery system 100 shown and described herein, the WT is positioned within the inner diameter of the flywheel such that the IVT and the flywheel have a common axis of rotation 140. The positioning of the IVT within the flywheel reduces the overall footprint of the energy recovery system and is facilitated by the use of a plurality of infinitely variable planetary (IVP) gear sets, as will be described in more detail herein.

Still referring to FIG. 2, the flywheel 112 may be generally cylindrical in shape. The axis of rotation 140 of the flywheel is generally coaxial with the long axis of the cylinder such that the mass of the flywheel is balanced about the axis of rotation 140. The flywheel may generally comprise a metallic material, such as a steel alloy or the like. However, it should be understood that the flywheel may be constructed of other materials including, without limitation, metals, ceramics, polymers, composite materials and/or combinations thereof. In one embodiment the flywheel may be encased in carbon fiber.

One end of the flywheel 112 may comprise a plate or web of material which extends across the end of the flywheel in a radial direction. The plate or web provides a mounting structure for a sun gear 118 (described in more detail herein) which may be affixed to the plate or web such that the axis of rotation of the sun gear is coaxial with the axis of rotation of the flywheel. Rotation of the flywheel 112 about the axis of rotation 140 is facilitated by bearing(s) 130 disposed between the sun gear 118 and the axis of rotation 140 of the flywheel.

Referring now to FIGS. 2 and 3, the IVT 102 may be rotationally coupled to the flywheel 112 such that rotational motion imparted to the IVT is transmitted to the sun gear 118 which, in turn, causes the rotation of the flywheel 112 about the axis of rotation 140. In one embodiment (not shown) the IVT 102 may be directly coupled to the flywheel 112. However, in the embodiments described herein, the flywheel 112 is rotationally coupled to the IVT 102 with a planetary gear set 116, as will be described in more detail herein.

Referring to FIGS. 2 and 3, the IVT 102 may generally comprise a plurality of input infinitely variable planetary gear sets (input IVPs), a plurality of output infinitely variable planetary gear sets (output IVPs), and an idler ring. Each input WP 104 and each output WP 106 generally comprise a roller element 160, 170 rotatably mounted on respective shafts or axles 162, 172. In the embodiments shown and described herein the roller elements 160, 170 have a curved outer surface. For example, as shown in FIGS. 2 and 3, the roller elements 160, 170 are substantially spherical. However, it should be understood that the roller elements 160, 170 may have other geometries including, without limitation, spheroids and the like. The axles 162, 172 are positioned in the roller elements 160, 170 to facilitate axis-symmetric rotation of the roller element about the respective axle.

In the embodiments shown and described herein, the idler ring 126 may be substantially circular or ring shaped and acts as a raceway on which the input IVPs 104 and output IVPs 106 rotate about the axis of rotation 140. Accordingly, it should be understood that the idler ring 126 may be centered in the energy recovery system 100 on the axis of rotation 140. For example, the IVT 102 may comprise eight input IVPs 104 and eight output IVPs 106. The input IVPs 104 may be positioned around the outer diameter of the idler ring 126 such that the roller elements 160 of the input IVPs contact the outer diameter of the idler ring 126 thereby forming a ring of input IVPs 104. Similarly, the output IVPs 106 may be positioned around the inner diameter of the idler ring 126 such that the roller elements 170 of the output IVPs 106 contact the inner diameter of the idler ring 126 thereby forming a ring of output IVPs 106.

More specifically, the input IVPs 104 may be pivotally coupled to the idler ring 126 with follower arms 164, 166 which are attached to the opposite end of each axle 162. The follower arms 164, 166 allow the roller elements 160 of the input IVPs 104 to be pivoted on their respective axles 162 with respect to the idler ring 126. Similarly, the output IVPs 106 may be pivotally coupled to the idler ring 126 with follower arms 174, 176 which are attached to the opposite end of each axle 172. The follower arms 174, 176 allow the roller elements 170 of the output IVPs 106 to be pivoted on their respective axles 172 with respect to the idler ring 126.

Figure 3A:
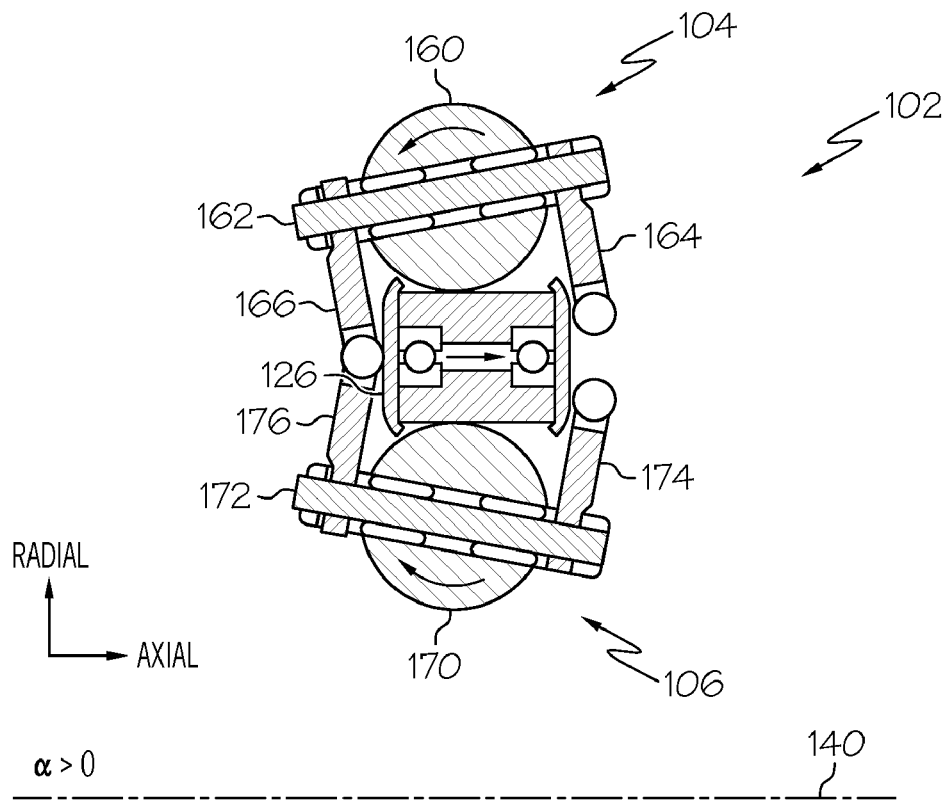
FIG. 3A-3C depict radial cross sections of an infinitely variable transmission in three different orientations for use in conjunction with one or more embodiments of the energy recovery system of FIG. 2.
Figure 3A:
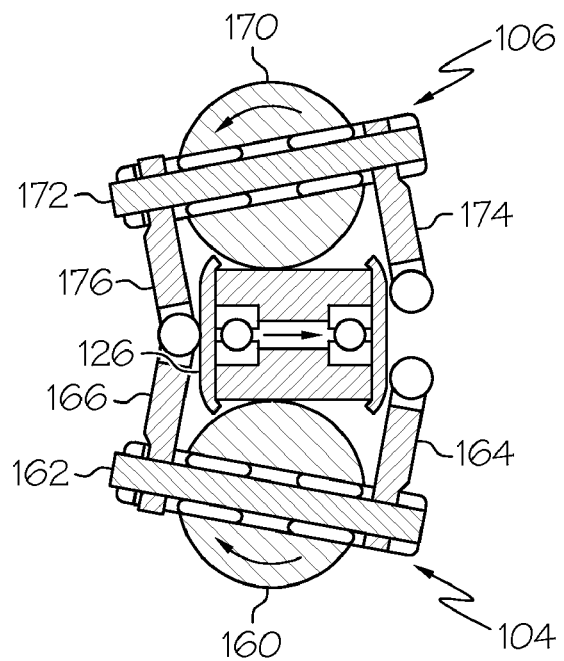
Figure 3B:
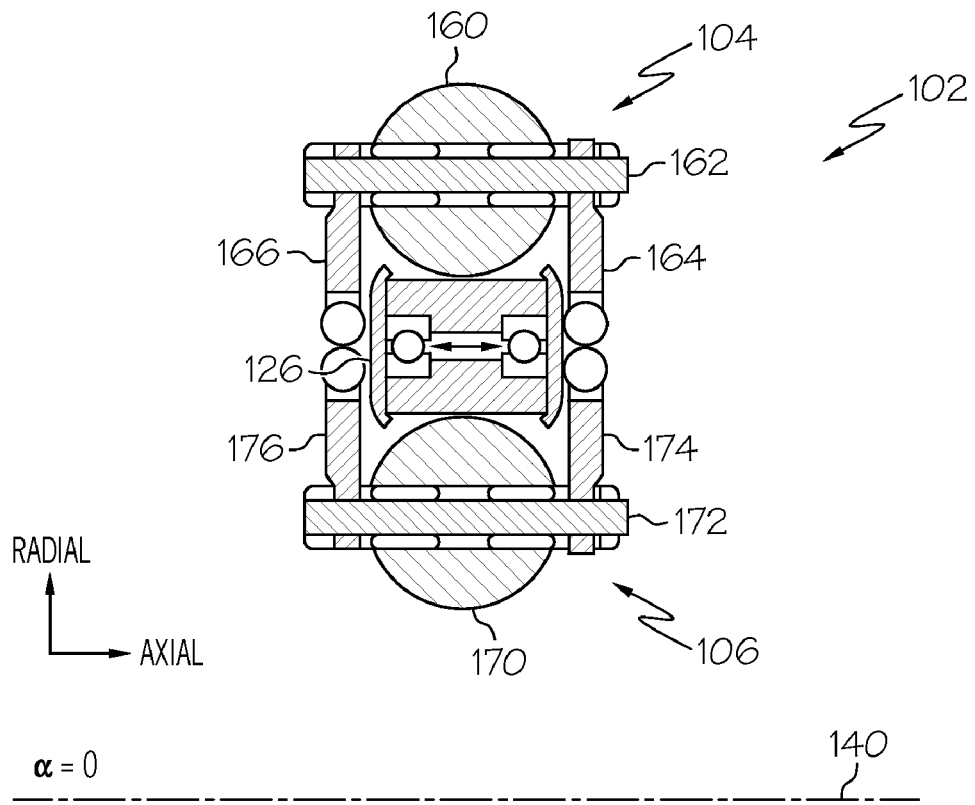
Figure 3B:
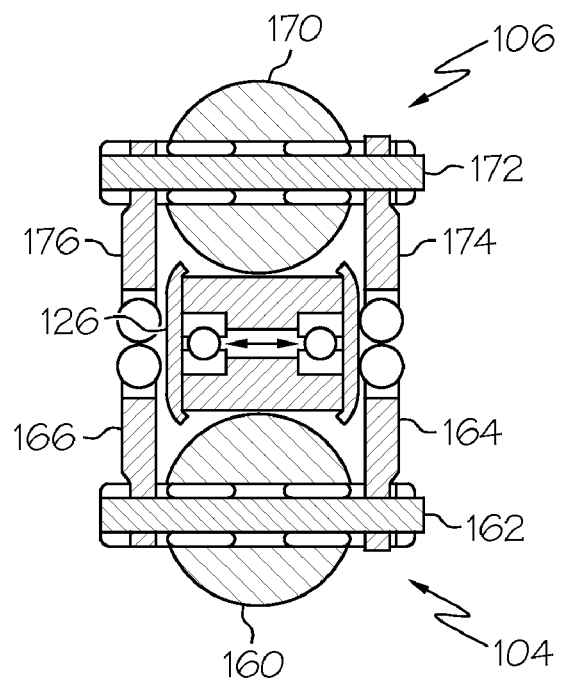
Figure 3C:
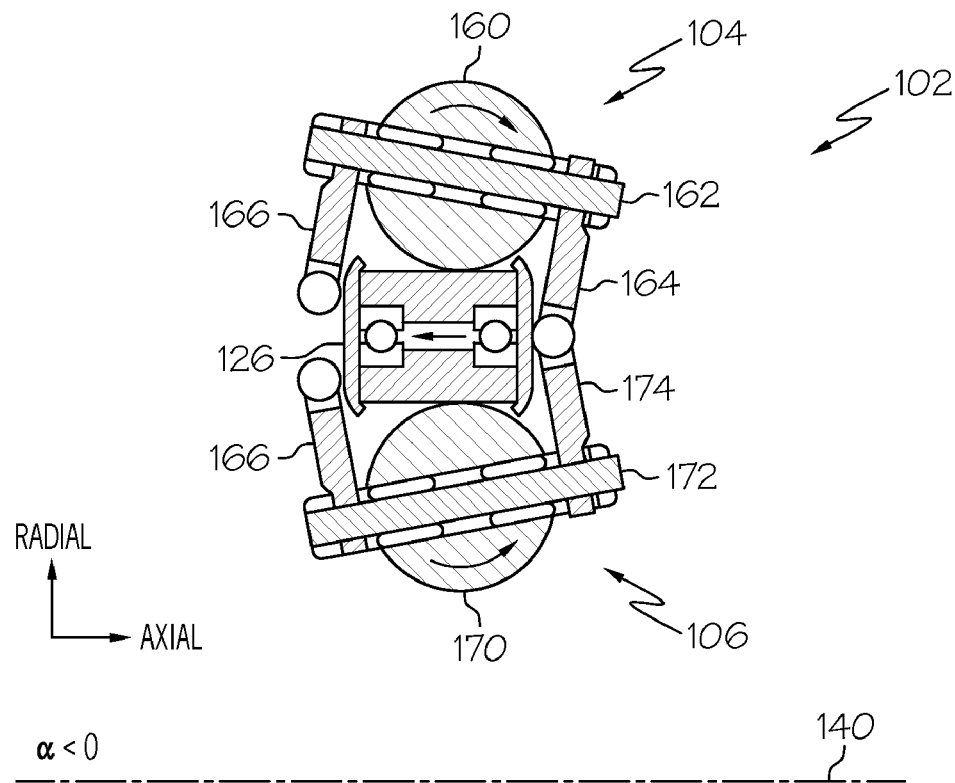
Figure 3C:
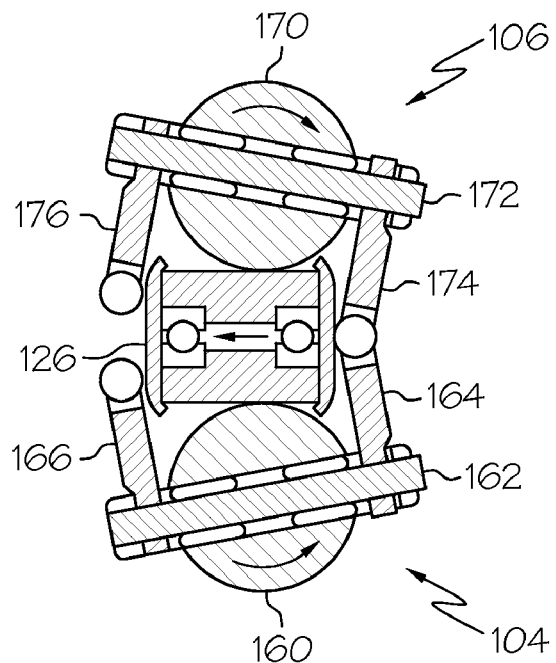
Figure 5:
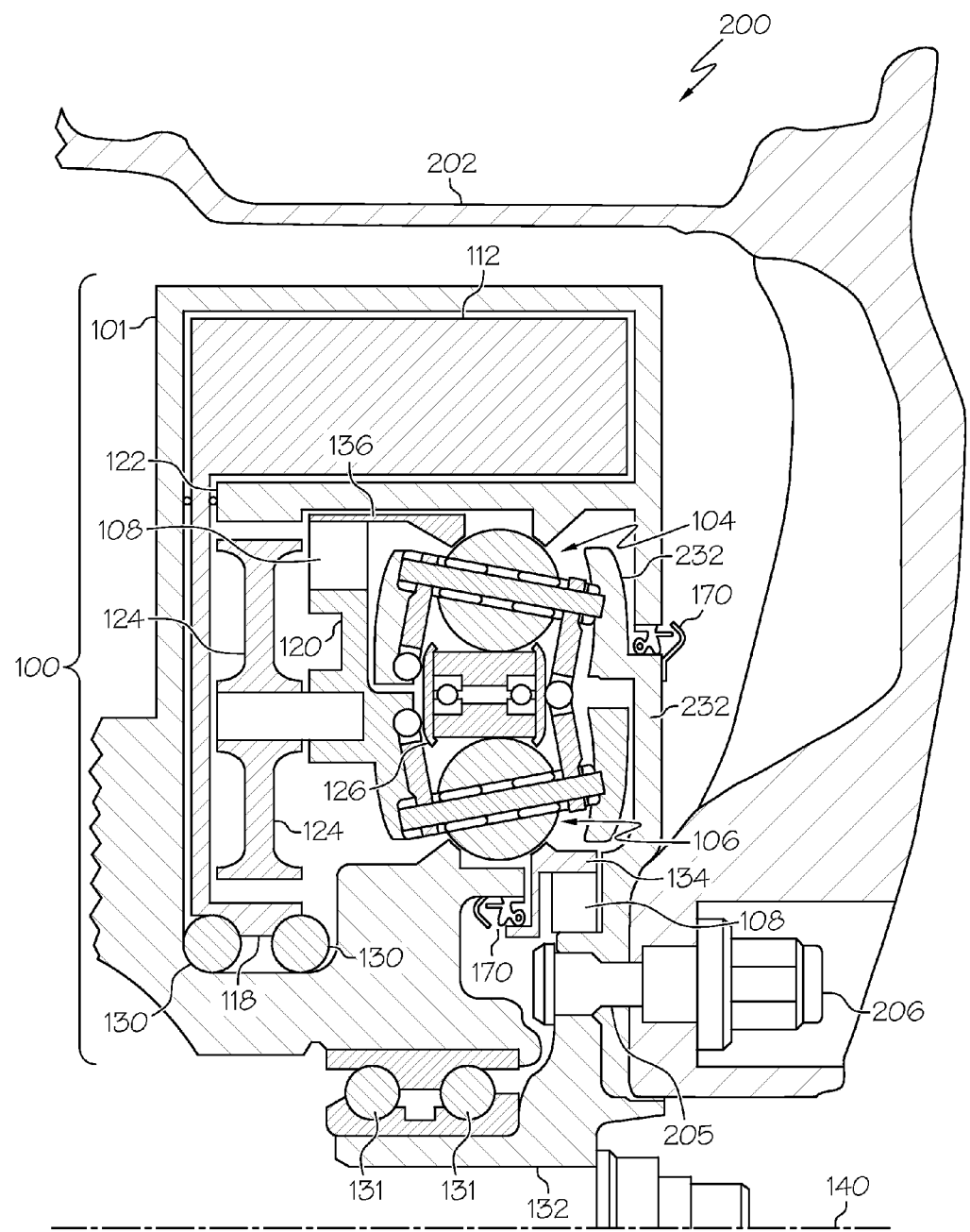
FIG. 5 depicts a partial radial cross section of a vehicle wheel comprising an energy recovery system according to one or more embodiments shown and described herein.

The roller elements 160, 170 of both the input IVPs 104 and the output IVPs 106 may be pivoted on the idler ring 126 by displacing the idler ring 126 axially (i.e., in a direction along the axis of rotation 140). For example, the idler ring 126 may be mechanically coupled to an actuator (not shown) such as a mechanical actuator, an electro-mechanical actuator or a hydraulic actuator, which displaces the idler ring 126 in an axial direction. Because the input IVPs 104 and the output IVPs 106 are in contact with the idler ring 126 but are not free to move in the axial direction (as shown in FIG. 5), when the idler ring 126 is displaced in the axial direction, the follower arms 164, 166 of the input IVPs 104 cause the axles 162 of each input IVP 104 to tilt with respect to the idler ring 126. Similarly, the follower arms 174, 176 of the input output IVPs 106 cause the axles 172 of each output IVP 106 to tilt with respect to the idler ring 126. The tilt of each axle is imparted to the corresponding roller element thereby adjusting the angular orientation of the roller element on the idler ring. In the embodiments shown and described herein, the tilt of each axle (i.e., the angle $\alpha$) causes the corresponding roller element to pivot on the idler ring. FIGS. 3A-3B show the orientation of the input IVP 104 and the output IVP 106 for three different values of $\alpha$.

As described above, the idler ring 126 is disposed between the input IVPs 104 and the output IVPs 106 such that the input IVPs 104 rotate about the outer diameter of the idler ring 126 and the output IVPs 106 rotate about the inner diameter of the idler ring 126. In order to facilitate rotation of the input IVPs 104 about the idler ring 126, the input IVPs 104 may be coupled to a source of rotational motion with input coupling 132. The input coupling 132 may rotate about the axis of rotation 140. Accordingly, when the input coupling 132 is connected to a source of rotational motion (not shown) which causes the input coupling to rotate about the axis of rotation 140, the input IVPs 104 are rotated around the idler ring 126 about the axis of rotation 140.

Referring to FIGS. 2 and 3, the input IVPs 104 may be frictionally engaged with the flywheel coupling ring 136 and the input coupling ring 135. The flywheel coupling ring 136 is generally ring shaped and is disposed within the flywheel 112 and substantially concentric with the flywheel such that the flywheel coupling ring 136 rotates about the axis of rotation 140. The input coupling ring 135 is generally ring shaped and is disposed within the flywheel 112 and substantially concentric with the flywheel 112. The input coupling ring 135 may be fixedly attached or grounded to the chassis 114 of the vehicle in which the energy recovery system is installed. As the input IVPs 104 rotate around the input coupling ring 135 and the idler ring 126, the roller elements 160 of the input IVPs 104 frictionally engage the flywheel coupling ring 136 thereby rotating the flywheel coupling ring about the axis of rotation 140.

As described hereinabove, the idler ring 126 may be displaced relative to the input IVPs 104 and the output IVPs 106 in the axial direction which, in turn, adjusts the angular orientation of the roller elements 160, 170 with respect to, for example, the flywheel coupling ring 136. When the angle $\alpha$ of the roller elements 160 is 0 degrees (i.e., when the axle of the roller element 160 is horizontal), the rotation of the input IVP 104 is not imparted to the flywheel coupling ring 136 and the energy recovery system 100 is essentially in neutral (i.e., no rotational motion is imparted to the flywheel). However, as the angle $\alpha$ of the roller elements 160 is increased, the rotational speed imparted to the flywheel coupling ring 136 is also increased. Accordingly, it should be understood that increasing the angle $\alpha$ of the roller element 160 increases the angular velocity of the flywheel 112.

In the embodiment of the energy recovery system shown in FIG. 2, the input IVP 104 is rotationally coupled to the flywheel coupling ring 136 which, in turn, is coupled to the flywheel 112 with a conventional planetary gear set 116. The planetary gear set 116 comprises a ring gear 122, a carrier 120, a plurality of pinion gears 124 and a sun gear 118. The ring gear 122 is fixedly attached or grounded to the housing (not shown) of the energy recovery system 100 which, in turn, may be fixedly attached or grounded to the chassis 114 of the vehicle in which the energy recovery system is installed. The carrier 120 may be disposed within and coaxial with the ring gear and operable to rotate relative to the ring gear. The sun gear may be disposed within the carrier 120 and operable to rotate relative to the ring gear and the carrier. The pinion gears 124 are rotationally coupled to the carrier 120 and engaged with the ring gear 122 and the sun gear 118 such that, as the carrier 120 is rotated relative to the ring gear 122, the pinion gears 124 mesh with the ring rear 122 and the sun gear 118 thereby imparting the rotational motion of the carrier 120 to the sun gear 118. As described hereinabove, the sun gear 118 is fixedly attached to the flywheel 112. Accordingly, it should be understood that rotation of the sun gear 118 also causes the rotation of the flywheel 112 thereby storing the rotational motion introduced into the energy storage device 100 at the input coupling 132 as mechanical potential energy in the flywheel 112.

In the embodiment of the energy recovery system 100 shown in FIG. 2, the flywheel coupling ring 136 may be rotationally coupled to the carrier 120 of the planetary gear set 116 such that the rotation of the flywheel coupling ring 136 may be imparted to the carrier 120. A one-way clutch 108, such as, for example, a sprag clutch, a roller clutch, a mechanical diode, or a rocker clutch may be disposed between the flywheel coupling ring 136 and the carrier 120. The one-way clutch facilitates imparting the rotational motion of the flywheel coupling ring 136 to the carrier 120 of the planetary gear set 116. However, the one-way clutch also prevents the rotation of the carrier 120 from being imparted to the flywheel coupling ring 136, such as when the flywheel coupling ring is spinning with an angular velocity which is slower than the angular velocity of the carrier 120.

The use of the planetary gear set 116 to couple the IVT 102 to the flywheel 112 introduces a gear reduction between the source of rotational motion introduced at the input coupling 132 and the sun gear 118 rotationally coupled to the flywheel 112. This gear reduction causes the sun gear 118 (and therefore the flywheel 112) to spin faster than the source of rotational motion coupled to the input coupling 136 which, in turn, improves the overall effectiveness of the energy recovery system 100.

Still referring to FIGS. 2 and 3, the carrier 120 of the planetary gear set 116 may also be coupled to the output IVPs 106 such that the rotation of the carrier 120 and, therefore, the rotation of the flywheel 112, may be imparted to the output IVPs 106 thereby causing the output IVPs 106 to rotate on the output coupling ring 133 and the idler ring 126 about the axis of rotation 140. The output coupling ring 133 is generally ring shaped and is disposed within the flywheel 112 and substantially concentric with the flywheel 112. The output coupling ring 133 may be fixedly attached or grounded to the chassis 114 of the vehicle in which the energy recovery system is installed. As the flywheel 112 rotates about the axis of rotation 140, the sun gear 118 is also rotated. The rotation of the sun gear 118 is imparted to the pinion gears 124 of the planetary gear set 116 which, in turn, rotate within the ring gear 122 thereby rotating the carrier 120 relative to the ring gear 122. Because the output IVPs 106 are coupled to the carrier 120, the rotation of the carrier 120 is imparted to the output IVPs 106 causing the output IVPs to rotate about the output coupling 133 and the inner diameter of the idler ring 126.

The roller elements 170 of the output IVPs 106 are frictionally engaged with the output coupling 134. The output coupling 134 is substantially ring shaped and couples the output IVPs 106 to an external device, such as, for example a vehicle wheel. As the output IVPs 106 rotate around the output coupling 133 and the idler ring 126, the roller elements 170 of the output IVPs 106 rotate the output coupling 134 about the axis of rotation 140. Accordingly, it should be understood that the rotational motion of the flywheel may be imparted to the output coupling 134 via the output IVP 106 and planetary gear set 116. A one way clutch 110, such as, for example, a sprag clutch, a roller clutch, a mechanical diode, or a rocker clutch, may be disposed between the output coupling 134 and any device and/or system (not shown) rotationally coupled to the output coupling 134. The one-way clutch facilitates imparting the rotational motion of the output coupling 134 to an external device or system coupled to the output coupling 134 and one way clutch 110. However, the one-way clutch prevents the rotation of the external device or system from being imparted to the output coupling 134, such as when the output coupling 134 is rotating about the axis of rotation 140 more slowly than the external device or system to which the output coupling 134 is attached.

As described hereinabove, the idler ring 126 may be displaced relative to the input IVPs 104 and the output IVPs 106 in the axial direction which, in turn, adjusts the angular orientation of the roller elements 160, 170 with respect to, for example, the output coupling 134. When the angle α of the roller elements 170 is 0 degrees (i.e., when the axle of the roller element 170 is horizontal), the rotation of the output IVP 106 is not imparted to the output coupling 134 and the energy recovery system 100 is essentially in neutral (i.e., no rotational motion is introduced in to the flywheel or released from the flywheel). However, as the angle α of the roller element 170 of the output IVP is increased, the rotational speed imparted to the output coupling 134 is also increased. Accordingly, it should be understood that increasing the angle α of the roller element 170 of the output IVP 106 increases the angular velocity of the output coupling 134.

While the IVT 102 of the energy recovery system 100 is described herein as comprising a pair of roller-type infinitely variable planetary gear sets (i.e., input IVP 104 and output IVP 106), it should be understood that various other types of infinitely variable transmission may be used in the energy recovery system 100 to transmit rotational motion from a source to the flywheel and from the flywheel back to the source.

Based on the foregoing, it should now be understood that the embodiments of the energy recovery system 100 described herein may be coupled to a source of rotational motion with the input coupling 132 such that the rotational motion of the source is imparted to the flywheel 112 via the IVT 102. When the angular velocity of the source is greater than the angular velocity of the flywheel, the rotational motion of the source is stored as mechanical potential energy in the flywheel 112 (i.e., the rotation of the flywheel is the mechanical potential energy). Further, the mechanical potential energy stored in the flywheel 112 may be imparted to the output coupling 134 via the IVT 102. The output coupling 134 may be operatively coupled to the source of rotational motion such that the mechanical potential energy is returned to the source of the rotational motion. Alternatively, the output coupling 134 may be operatively coupled to another mechanism or system driven by rotational kinetic energy. When the angular velocity of the flywheel is greater than the angular velocity of the device or system coupled to the output coupling 134, the mechanical potential energy stored in the flywheel is imparted to the device or system coupled to the output coupling. Specific examples of the energy recovery system 100 will now be described in more detail with specific reference to FIGS. 4-7.

Figure 4:
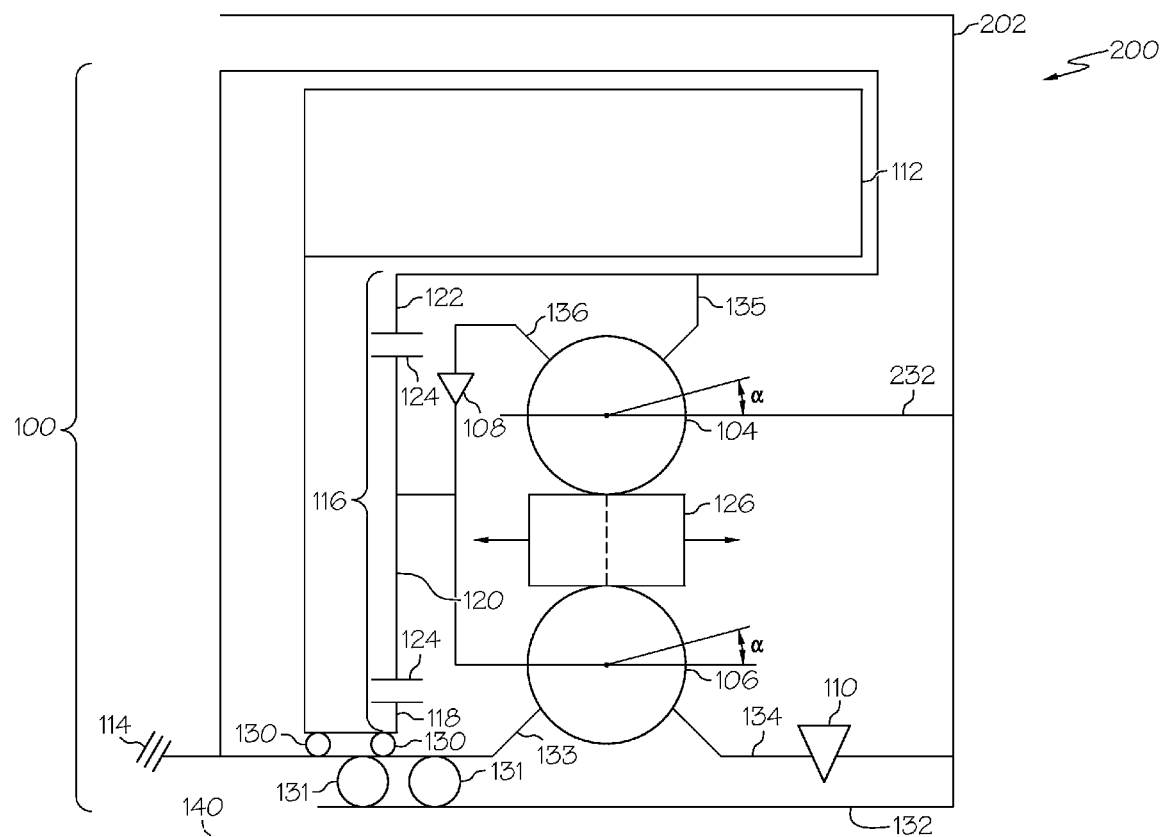
FIG. 4 depicts a schematic diagram of a partial cross section of the energy recovery system of FIG. 2 positioned within and rotationally coupled to a vehicle wheel.

Referring now to FIGS. 4 and 5, a partial radial cross section of a wheel assembly 200 comprising an energy recover system 100 is depicted. In the embodiments of the wheel assembly 200 described herein, the rim 202 may be configured to receive a tire (not shown) which extends around the circumference of the rim 202. However, it should also be understood that, in other embodiments, a tire need not be positioned around the rim 202, such as when the wheel assembly 200 is a train wheel or similar vehicle wheel which does not require the use of a tire. The rim 202 may be mechanically coupled to a wheel hub 132 with conventional connectors such as lugs 205 and lug nuts 206 such that, as the wheel assembly 200 is rotated, the rotational motion of the wheel assembly 200 and rim 202 is imparted to the wheel hub 132.

In the embodiments shown and described herein, the energy recovery system 100 may be positioned within the rim 202 and rotationally coupled to the wheel hub 132 and fixedly coupled to the chassis (not shown) of the vehicle. More specifically, the energy recovery system 100 is positioned in the wheel assembly 200 such that the axis of rotation 140 of the energy recovery system 100 is coaxial with the axis of rotation 140 of the wheel. Bearings 131 may be disposed between the housing 101 of the energy recovery system 100 and the wheel hub such that the wheel hub 132 is free to rotate with respect to the housing 101 of the energy recovery system which is fixed to the vehicle chassis. The wheel hub 132 is rotationally coupled to the input IVPs 104 with hub connector 232 such that, as the wheel hub rotates, the input IVPs are rotated about the input coupling ring 135 and the idler ring 126, as described above. Specifically, the axles of each input IVP 104 are pivotally linked to the hub connector 232 which, in turn, is coupled to the wheel hub 132 with the lugs 205 and lug nuts 206. Rotation of the wheel hub 132 is transferred to the input IVP via the hub connector 232 which rotates the input IVP 104, as shown in FIG. 5. Accordingly, in this embodiment, it should be understood that that the wheel hub 132 and hub connector 232 are the input coupling to the input IVPs 104 of the energy recovery system 100. The output IVPs are coupled to the wheel hub 132 with the output coupling 134 and one-way clutch 110.

Still referring to FIGS. 4 and 5, as the rim 202 rotates about the axis of rotation 140 at an angular velocity greater than the flywheel, the rotational motion of the rim 202 is imparted to the wheel hub 132 which, in turn, rotates the input IVPs 104 about the input coupling ring 135 and the idler ring 126. As the input IVPs 104 rotate about the input coupling ring 135 and the idler ring 126 (and provided the tilt angle α>0), the roller elements 160 of the input IVPs may be frictionally engaged with the flywheel coupling ring 136 and rotate the flywheel coupling ring 136 about the axis of rotation 140. As the flywheel coupling ring 136 rotates, the carrier 120 of the planetary gear set 116 coupled to the flywheel coupling ring 136 is also rotated which, in turn, rotates the pinion gears 124 and sun gear 118. Rotation of the sun gear 118 causes the rotation of the flywheel 112 relative to the rim 202. Because the flywheel 112 is coupled to the rim 202 with a planetary gear set 116, the flywheel 112 spins faster than the rim 202, as described herein above.

When the angular velocity of the flywheel 112 is greater than the angular velocity of the rim 202, the flywheel 112 rotates the sun gear 118 which, in turn, rotates the pinion gears 124 and the carrier 120 relative to the ring gear 122. The one-way clutch 108 disposed between the carrier 120 and the flywheel coupling ring 136 prevents the carrier 120 from rotating the flywheel coupling ring 136. However, the carrier 120 is also rotationally coupled to the output IVPs 106 such that rotation of the carrier 120 causes the output IVPs 106 to rotate within the output ring 133 and the idler ring 126. As the output IVPs 106 rotate (and provided the tilt angle α>0), the roller elements 170 of the output IVPs are frictionally engaged with the output coupling 134 and rotate the output coupling 134 about the axis of rotation 140. As the output coupling 134 rotates, the one way clutch 110 couples the output coupling 134 to the wheel hub 232 thereby rotating the wheel hub about the axis of rotation 140 and accelerating the rim 202 of the wheel assembly 200.

Because the energy recovery system 100 may both absorb rotational energy from the rim 202 and impart rotational energy to the rim 202, it should be understood that the energy recovery system 100 may serve both a vehicle braking function and a vehicle acceleration function. For example, when the flywheel is absorbing energy from the rim 202, the kinetic energy of the wheel is absorbed thereby slowing the rotation of the wheel and, therefore, decelerating the vehicle to which the wheel is attached. Further, as the energy recovery system discharges mechanical potential energy to the rim 202, the angular velocity of the rim 202 is increased, thereby accelerating the rim 202 and wheel assembly 200 and, therefore the vehicle to which the wheel is attached. As will be described in more detail herein, the vehicle braking function and vehicle acceleration function may be dependent on the angular velocity of the wheel, the angular velocity of the flywheel, and the tilt angle of the IVPs in the infinitely variable transmission of the energy recovery system 100.

Figure 6:
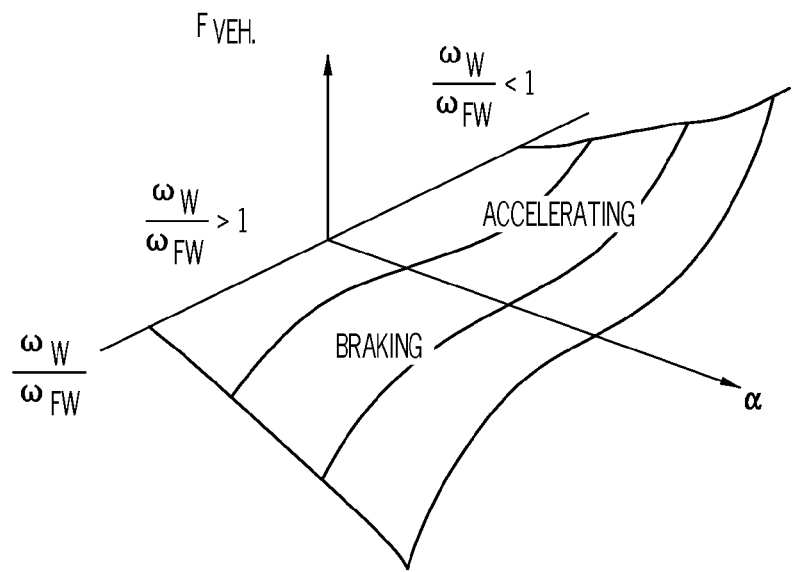
FIG. 6 is a three dimensional plot representing the relationship between the driving force applied to the vehicle, the angular orientation of the infinitely variable planetary gear sets in the infinitely variable transmission, and the ratio of the angular velocity of the wheel to the angular velocity of the flywheel of the energy recovery system.

Referring now to FIG. 6, $F_{VEH}$ describes the magnitude of the motive force imparted to the wheel of the vehicle by the energy recovery system 100. When $F_{VEH}$ is a positive value, the energy recovery system 100 is discharging rotational energy from the flywheel to the vehicle wheel thereby accelerating the vehicle. However, when $F_{VEH}$ is a negative value, the energy recovery system 100 is absorbing energy from the wheel of the vehicle and, as such, is slowing or braking both the wheel and the vehicle. As described hereinabove, the energy recovery system may be engaged with the wheel by adjusting the axial position of the idler ring such that the tilt angle α>0. Accordingly, when the tilt angle α=0, the energy recovery system does not absorb energy from the wheel or discharge energy to the wheel. However, when the idler ring is positioned such that the tilt angle α>0, the energy recovery system is coupled to the wheel such that the rotational kinetic energy of the wheel may be absorbed by the flywheel thereby slowing the wheel. Alternatively, the mechanical potential energy of the flywheel may be imparted to the wheel thereby accelerating the wheel. Whether the energy recovery system serves a braking function or an accelerating function is dependent on the relative angular velocities of the wheel and the flywheel.

As illustrated in FIG. 6, the motive force $F_{VEH}$ may be a function of the angular velocity of the wheel ($\omega_W$), the angular velocity of the flywheel ($\omega_{FW}$) and the tilt angle α. More specifically, FIG. 6 graphically illustrates the relationship between $F_{VEH}$, the ratio $\omega_W:\omega_{FW}$ and the tilt angle α. When the tilt angle α>0 and the ratio $\omega_W:\omega_{FW}$>1 (i.e., the angular velocity of the wheel is greater than the angular velocity of the flywheel), the flywheel is in an energy absorbing mode and the rotational energy of the wheel is absorbed by the flywheel thereby slowing the rotation of the wheel and providing a braking force to the wheel and the vehicle. Under these conditions, the energy recovery system is absorbing energy from the vehicle instead of imparting energy to the vehicle and, as such, the motive force imparted to the vehicle ($F_{VEH}$) is negative. Moreover, the amount of energy absorbed by the energy recovery system increases as the tilt angle α increases. Therefore, as the tilt angle α increases, the motive force ($F_{VEH}$) becomes more negative thus indicating that the braking effect of the energy recovery system increases as the tilt angle α increases thereby providing more braking assist to the vehicle However, when the tilt angle α>0 and the ratio $\omega_W:\omega_{FW}$<1 (i.e., the angular velocity of the flywheel is greater than the angular velocity of the wheel), the flywheel is in an energy discharge mode and the rotational energy of the flywheel is discharged back to the wheel via the wheel hub thereby increasing the angular velocity of the wheel and providing an accelerating force to the vehicle. Under these conditions, the energy recovery system is discharging energy from the flywheel and the motive force imparted to the vehicle ($F_{VEH}$) is positive. Moreover, the amount of energy discharged by the energy recovery system to the wheel increases as the tilt angle α increases. Accordingly, as the as the tilt angle α increases, the acceleration of the wheel and the vehicle also increases.

Figure 7:
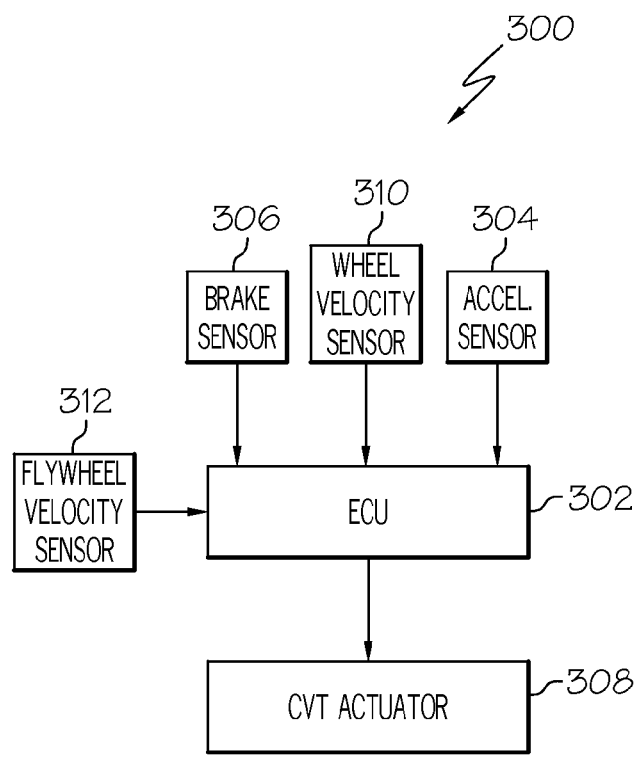
FIG. 7 is a schematic diagram of a control system for an energy recovery system according to one or more embodiments shown and described herein.

Referring now to FIGS. 5 and 7, one embodiment of a control system 300 for use with the energy recovery system 100 is schematically depicted. The control system 300 generally comprises an electronic control unit (ECU) 302, a brake sensor 306, an accelerator sensor 304, an IVT actuator 308, a wheel velocity sensor 310 and a flywheel velocity sensor 312. The electronic control unit 302 may comprise a programmable logic controller or similar computer processor operable to execute a programmed or hardwired instruction set. The brake sensor, accelerator sensor and IVT actuator may be electrically coupled to the ECU and the ECU may be operable to receive electronic signals from each of the brake sensor and accelerator sensor and, based on the received signals, output a control signal to the IVT actuator.

The accelerator sensor 304 may be any suitable sensor coupled to the accelerator or throttle control system of a vehicle and operable to output a signal indicative of the amount of acceleration desired by the operator of the vehicle. For example, in one embodiment, where the vehicle is an automobile or truck, the accelerator sensor may be coupled to the accelerator of the vehicle and operable to determine the displacement of the accelerator as an indicator of the amount of acceleration desired by the vehicle operator. In another embodiment, the accelerator sensor may be operatively connected to the throttle of the vehicle and operable to determine the amount of acceleration desired by the driver based on the displacement of the throttle. Accordingly, it should be understood that the accelerator sensor 304 may generally output a signal to the ECU proportional to the amount of acceleration desired by the vehicle operator.

The brake sensor 306 may be any suitable sensor coupled to the brake system of a vehicle and operable to output a signal indicative of the amount of braking desired by the vehicle operator. For example, in one embodiment where the vehicle is an automobile or truck, the brake sensor may be coupled to the brake pedal of a vehicle and operable to determine the displacement of the brake pedal as an indicator of the amount of braking force desired by the vehicle operator. In another embodiment, the brake sensor may be positioned in the brake master cylinder and operable to determine the pressure of the fluid in the master cylinder as an indicator of the amount of braking force desired by the vehicle operator. Accordingly, it should be understood that the brake sensor 306 may generally output a signal to the ECU proportional to the amount of braking force desired by the vehicle operator.

The IVT actuator 308 may be a mechanical, electro-mechanical, pneumatic, or hydraulic actuator operatively coupled to the idler ring 126 of the IVT 102 of the energy recovery system 100. As described above, the idler ring 126 may be displaced in an axial direction relative to the input IVPs 104 and the output IVPs 106 such that the tilt angle $\alpha$ of the input IVPs 104 and output IVPs 106 are adjusted relative to the idler ring 126 thereby engaging or disengaging the energy recovery system with an attached source of rotational motion. The IVT actuator 308 may be coupled to the idler ring 126 and operable to displace the idler ring 126 in an axial direction based on control signals received from the ECU 302.

The wheel velocity sensor 310 may be any suitable sensor coupled to the wheel of the vehicle and operable to output a signal indicative of the angular velocity of the rim. In the embodiments described herein, the wheel velocity sensor 310 is electrically coupled to the ECU 302 which is programmed to receive a signal indicative of the speed of the wheel from the wheel velocity sensor 310 and, based on the signal, engage or disengage the infinitely variable transmission from the flywheel and rim.

Similarly, the flywheel velocity sensor 312 may be any suitable sensor coupled to the flywheel of the energy recovery system and operable to output a signal indicative of the angular velocity of the flywheel. In the embodiments described herein, the flywheel velocity sensor 312 is electrically coupled to the ECU 302 which is programmed to receive a signal indicative of the speed of the flywheel from the wheel velocity sensor 310 and, based on the signal, engage or disengage the infinitely variable transmission form the flywheel and rim.

The use of the control system 300 to control the energy recovery system 100 positioned in the wheel assembly 200 will now be described with specific reference to FIGS. 5, 6 and 7. When the vehicle is at rest, such as when the vehicle comes to a stop following deceleration, the control system 300 may be programmed to disengage the infinitely variable transmission from the wheel and the rim by sending a control signal to the IVT actuator 308 which causes the IVT actuator 308 to displace the idler ring 126 of the infinitely variable transmission such that the tilt angle $\alpha$ of the input IVPs 104 and the output IVPs 106 is zero. The control system 300 may be operable to determine when the vehicle is at rest with the wheel velocity sensor 310. The wheel velocity sensor 310 may be operable to output a signal indicative of the angular velocity of the rim to the ECU 302 which disengages the infinitely variable transmission from the flywheel and rim when the angular velocity of the rim is zero.

When the vehicle is accelerating from a stop, the ECU 302 receives an electronic signal from the accelerator sensor indicative of the amount of acceleration desired by the vehicle operator. When the velocity of the flywheel is greater than the velocity of the wheel (as determined with the flywheel velocity sensor 312 and the wheel velocity sensor 310), the ECU 302 may be programmed to send a control signal to the IVT actuator 308 which displaces the idler ring 126 in an axial direction such that the tilt angle $\alpha$ of the input IVPs 104 and the output IVPs 106 is greater than zero. The amount which the IVT actuator 308 is displaced (and therefore the tilt angle $\alpha$) is directly proportional to the amount of acceleration desired by the vehicle operator as indicated by the electronic signal received from the accelerator sensor 304. In this mode of operation, when the angular velocity of the flywheel 112 is greater than the angular velocity of the rim 202 (i.e., $\omega_W : \omega_{FW} < 1$), the mechanical kinetic energy stored in the flywheel is imparted to the wheel rim via the output IVPs 106 and output coupling 134 thereby accelerating both the wheel and the vehicle. As the amount of acceleration desired by the vehicle operator changes (e.g., increases or decreases) as determined by the accelerator sensor 304, the ECU 302 may be programmed to send a control signal to the IVT actuator 308 which adjusts the axial displacement of the idler ring 126 and, as such, the tilt angle $\alpha$ of the input IVPs 104 and the output IVPs 106. As described hereinabove, increasing the tilt angle $\alpha$ adjusts the speed of rotation of the output coupling 134 and, therefore, the amount of rotational energy imparted to the wheel assembly 200 of the vehicle. Accordingly as the tilt angle $\alpha$ increases, the angular velocity of the output coupling 134 increases and the motive force $F_{VEH}$ imparted to the vehicle increases thus accelerating the wheel and the vehicle.

After the mechanical potential energy of the wheel is discharged to the wheel rim following the initial acceleration of the vehicle from a stop, the ECU 302 may be programmed to send a control signal to the IVT actuator 308 causing the IVT actuator 308 to disengage the infinitely variable transmission from the flywheel and the rim. For example, the velocity of the flywheel may be determined with the flywheel velocity sensor which provides the ECU 302 with a signal indicative of the angular velocity of the flywheel. When the angular velocity of the flywheel is zero, the ECU 302 disengages the IVT from the flywheel and the rim, as described above.

Similarly, when the vehicle is in motion and the operator desires to slow or brake the vehicle, the ECU 302 receives a signal from the brake sensor 306 indicative of the amount of braking desired by the vehicle operator. When the angular velocity of the flywheel is less than the angular velocity of the wheel (as determined with the wheel velocity sensor 310 and the flywheel velocity sensor 312), the ECU 302 may be programmed to output a control signal to the IVT actuator 308 which axially displaces the idler ring 126. The amount which the IVT actuator 308 displaces the idler ring 126 (and therefore the resulting tilt angle $\alpha$) is directly proportional to the amount of braking desired by the vehicle operator as indicated by the electronic signal received from the brake sensor. In this mode of operation, when the angular velocity of the flywheel 112 is less than the angular velocity of the rim 202 (i.e., $\omega_W : \omega_{FW} > 1$), the rotational motion of the wheel assembly 200 is imparted to the flywheel 112 via the wheel hub 132 the hub connector 232, the input IVPs 104, flywheel coupling ring 136 and planetary gear set 116. As the kinetic energy of the wheel is imparted to the flywheel, the rotation of the wheel is slowed thereby braking the wheel and the vehicle to which the wheel is attached. As the amount of braking desired by the driver changes (e.g., increases or decreases) as determined by the brake sensor 306, the ECU 302 may be programmed to send a control signal to the IVT actuator 308 which adjusts the axial displacement of the idler ring 126 and, as such, the tilt angle α of the input IVPs 104 and the output IVPs 106. As described hereinabove, adjusting the tilt angle α adjusts the speed of rotation of the flywheel 112 and the amount of rotational energy absorbed by the by the flywheel 112. Accordingly as the tilt angle α increases, the angular velocity of the flywheel increases and the motive force $F_{VEH}$ imparted to the vehicle decreases thus providing more braking assist to the vehicle.

It should now be understood that the embodiments of the energy recovery system described herein may be used in conjunction with the wheel of a vehicle to provide the wheel with braking or supplement the acceleration of the wheel. For example, in one embodiment a front wheel drive vehicle may use a conventional braking system on the front wheels of the vehicle while each of the rear wheels of the vehicle comprise an energy recovery system as described herein. In an alternative embodiment, at least one of the wheels of a vehicle may comprise an energy recovery system as described herein while the remaining wheels of the vehicle utilize conventional braking systems.

One advantage of the energy recovery systems described herein is the relatively high conversion efficiency of the input and output IVPs. It is believed that the roller type IVPs described herein generally have an efficiency of greater than about 85% when converting rotational kinetic energy to mechanical potential energy or converting mechanical potential energy to rotational kinetic energy. When the input and output IVPs are utilized in the energy recovery systems described herein, it is believed that the overall efficiency of the energy recovery system exceeds 60%.

While specific examples described herein are directed to the use of the energy recovery system in conjunction with a vehicle wheel, it is contemplated that the energy recovery system may be used in conjunction with other sources of rotational motion to achieve the same vehicle braking and accelerating functions. For example, the input of the energy recovery system may be directly coupled to the output shaft of a vehicle engine while the output of the energy recovery system may be coupled to the driveline thereby providing both engine braking as well providing acceleration assist to the driveline. Accordingly, it should be understood that the energy recovery system may be used in various other applications in which the recovery, storage and re-distribution of rotational kinetic energy may be desirable.

Further, it should also be understood that the energy recovery systems described herein may be used in conjunction with various wheeled vehicles including, without limitation, automobiles, trucks, trains, motorcycles, bicycles and the like, irrespective of the motive force which is used to propel the vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheel assembly for a vehicle comprising a rim and an energy recovery system, the energy recovery system comprising a flywheel and an infinitely variable transmission wherein:
   the flywheel is substantially concentric with the rim and operable to rotate relative to the rim;
   the infinitely variable transmission is positioned within the flywheel and couples the rim to the flywheel such that:
      when the vehicle is decelerating and an angular velocity of the rim is greater than an angular velocity of the flywheel, kinetic energy of the rim is imparted to the flywheel and stored as mechanical potential energy thereby providing a braking force to the vehicle; and
      when the vehicle is accelerating and the angular velocity of the rim is less than the angular velocity of the flywheel, the mechanical potential energy of the flywheel is imparted to the rim thereby providing an accelerating force to the vehicle.

2. The wheel assembly of claim 1 wherein the infinitely variable transmission comprises an idler ring, a plurality of input infinitely variable planetary gear sets and a plurality of output infinitely variable planetary gear sets, wherein:
   the idler ring is concentric with the flywheel;
   the plurality of input infinitely variable planetary gear sets are pivotally engaged with an outer diameter of the idler ring and operable to rotate on the outer diameter of the idler ring, wherein:
      the input infinitely variable planetary gear sets are rotationally coupled to the rim such that a rotation of the rim rotates the input infinitely variable planetary gear sets on the outer diameter of the idler ring;
      the input infinitely variable planetary gear sets are operable to frictionally engage a flywheel coupling ring concentric with the flywheel and rotationally coupled to the flywheel such that rotation of the input infinitely variable planetary gear sets around the idler ring is imparted to the flywheel via the flywheel coupling ring;
   the plurality of output infinitely variable planetary gear sets are pivotally engaged with an inner diameter of the idler ring and operable to rotate on the inner diameter of the idler ring, wherein:
      the output infinitely variable planetary gear sets are rotationally coupled to the flywheel such that the rotation of the flywheel rotates the output infinitely variable planetary gear sets on the inner diameter of the idler ring;
      the output infinitely variable planetary gear sets are operable to frictionally engage an output coupling concentric with the flywheel and rotationally coupled to the rim such that rotation of the output infinitely variable planetary gear sets is imparted to the rim via the output coupling; and
   the idler ring is axially displaceable with respect to the input infinitely variable planetary gear sets and the output infinitely variable planetary gear sets thereby pivoting the input infinitely variable planetary gear sets and the output infinitely variable planetary gear sets such that the input infinitely variable planetary gear sets and the output infinitely variable planetary gear sets are frictionally engaged or disengaged with the flywheel coupling ring and the output coupling, respectively.

3. The wheel assembly of claim 2 wherein, when the input infinitely variable planetary gear sets and the output infinitely variable planetary gear sets are pivoted, the flywheel is engaged with the input infinitely variable planetary gear sets and the output infinitely variable planetary gear sets.

4. The wheel assembly of claim 2 wherein each of the input infinitely variable planetary gear sets and the output infinitely variable planetary gear sets comprise a roller element positioned on an axle and the axle is pivotally coupled to the idler ring with a pivoting linkage and a follower arm.

5. The wheel assembly of claim 4 wherein the roller element is a sphere.

6. The wheel assembly of claim 4 wherein the roller element is spheroidal.

7. The wheel assembly of claim 2 further comprising a planetary gear set having a ring gear, a carrier concentric with the ring gear, a sun gear concentric with the carrier, and a plurality of pinion gears rotatably attached to the carrier and engaged with the ring gear and a sun gear, wherein:
  the ring gear is fixed with respect to the carrier and the sun gear;
  the sun gear is attached to the flywheel such that the sun gear and the flywheel are operable to rotate with one another about a common axis of rotation relative to the ring gear; and
  the carrier is rotatable with respect to the ring gear and rotationally coupled to the flywheel coupling ring with a one way clutch and to the output infinitely variable planetary gear sets.

8. The wheel assembly of claim 2 further comprising a one way clutch that rotationally couples the flywheel coupling ring to the flywheel such that rotation of the flywheel is not imparted to the flywheel coupling ring and the input infinitely variable planetary gear sets.

9. The wheel assembly of claim 2 further comprising a one way clutch that rotationally couples the output coupling to the rim such that rotation of the rim is not imparted to the output coupling and the output infinitely variable planetary gear sets.

10. An energy recovery system comprising a flywheel and an infinitely variable transmission), wherein the infinitely variable transmission rotationally couples the flywheel to a source of rotational motion with an input coupling and to an external system with an output coupling and the infinitely variable transmission comprises an idler ring, a plurality of input infinitely variable planetary gear sets and a plurality of output infinitely variable planetary gear sets, wherein:
  the idler ring is concentric with the flywheel;
  the plurality of input infinitely variable planetary gear sets are pivotally engaged with an outer diameter of the idler ring and operable to rotate on the outer diameter of the idler ring, wherein:
    the input infinitely variable planetary gear sets are rotationally coupled to the input coupling such that a rotation of the input coupling rotates the input infinitely variable planetary gear sets on the outer diameter of the idler ring;
    the input infinitely variable planetary gear sets are operable to frictionally engage with a flywheel coupling ring concentric with the flywheel and rotationally coupled to the flywheel such that rotation of the input infinitely variable planetary gear sets around the idler ring is imparted to the flywheel via the flywheel coupling ring;
  the plurality of output infinitely variable planetary gear sets are pivotally engaged with an inner diameter of the idler ring and operable to rotate on the inner diameter of the idler ring, wherein:
    the output infinitely variable planetary gear sets are rotationally coupled to the flywheel such that the rotation of the flywheel rotates the output infinitely variable planetary gear sets on the inner diameter of the idler ring;
    the output infinitely variable planetary gear sets are operable to frictionally engage with an output coupling concentric with the flywheel such that rotation of the output infinitely variable planetary gear sets is imparted to the output coupling; and
  the idler ring is axially displaceable with respect to the input infinitely variable planetary gear sets and the output infinitely variable planetary gear sets thereby pivoting the input infinitely variable planetary gear sets and the output infinitely variable planetary gear sets such that the input infinitely variable planetary gear sets and the output infinitely variable planetary gear sets are frictionally engaged or disengaged with the flywheel coupling ring and the output coupling, respectively.

11. The energy recovery system of claim 10 wherein, when the input coupling is coupled to the source of rotational motion, the input infinitely variable planetary gear sets are frictionally engaged with the flywheel coupling ring and an angular velocity of the source is greater than an angular velocity of the flywheel, kinetic energy from the source is imparted to the flywheel and stored as mechanical potential energy.

12. The energy recovery system of claim 10 wherein, when the output coupling is coupled to the external system, the output infinitely variable planetary gear sets are engaged with the output coupling and an angular velocity of the external system is less than the angular velocity of the flywheel, mechanical potential energy of the flywheel is imparted to the external system.

13. The energy recovery system of claim 10 wherein the external system is the source of rotational motion.

14. The energy recovery system of claim 10 further comprising a planetary gear set having a ring gear, a carrier concentric with the ring gear, a sun gear concentric with the carrier, and a plurality of pinion gears rotatably attached to the carrier and engaged with the ring gear and a sun gear, wherein:
  the ring gear is fixed with respect to the carrier and the sun gear;
  the sun gear is attached to the flywheel such that the sun gear and the flywheel are operable to rotate with one another about a common axis of rotation relative to the ring gear; and
  the carrier is rotatable with respect to the ring gear and rotationally coupled to the flywheel coupling ring with a one way clutch and to the output infinitely variable planetary gear sets.

15. The energy recovery system of claim 10 further comprising a one way clutch that rotationally couples the flywheel coupling ring to the flywheel such that rotation of the flywheel is not imparted to the flywheel coupling ring and the input infinitely variable planetary gear sets.

16. The energy recovery system of claim 10 further comprising a one way clutch for rotationally coupling the output coupling to the external system such that rotation of the external system is not imparted to the output coupling.

17. The energy recovery system of claim 10 wherein each of the input infinitely variable planetary gear sets and the output infinitely variable planetary gear sets comprise a roller element positioned on an axle and the axle is pivotally coupled to the idler ring with a pivoting linkage and a follower arm.

18. An energy recovery control system for a vehicle having at least one wheel assembly comprising a rim and an energy recovery system having a flywheel disposed in the rim and an infinitely variable transmission coupling the rim to the flywheel, wherein:

the energy recovery control system comprises an electronic control unit electrically coupled to a brake sensor, an accelerator sensor, and an IVT actuator, wherein the brake sensor is coupled to a braking system of the vehicle, the accelerator sensor is coupled to a throttle control system of the vehicle, the IVT actuator is coupled to the infinitely variable transmission and the electronic control unit is programmed to:

receive a signal from the brake sensor indicative of an amount of braking desired by a vehicle operator when the vehicle is decelerating;

receive a signal from the accelerator sensor indicative of an amount of acceleration desired by the vehicle operator when the vehicle is accelerating from a stop; and output a control signal to the IVT actuator to engage the infinitely variable transmission with the flywheel and the rim based on one of the signal from the brake sensor or the signal from the accelerator sensor when the vehicle is accelerating from a stop or decelerating.

19. The energy recovery control system of claim 18 wherein:

when the IVT actuator engages the infinitely variable transmission with the flywheel and the rim, the vehicle is decelerating, and an angular velocity of the rim is greater than an angular velocity of the flywheel, kinetic energy of the rim is imparted to the flywheel and stored as mechanical potential energy thereby providing a braking force to the vehicle; and when the IVT actuator engages the infinitely variable transmission with the flywheel and the rim, the vehicle is accelerating, and the angular velocity of the rim is less than the angular velocity of the flywheel, the mechanical potential energy of the flywheel is imparted to the rim thereby providing an accelerating force to the vehicle.

20. The energy recovery control system of claim 18 further comprising a wheel velocity sensor coupled to the electronic control unit and the rim and a flywheel velocity sensor coupled to the electronic control unit a and the flywheel, wherein the electronic control unit is further programmed to:

receive a signal from the wheel velocity sensor indicative of the angular velocity of the rim;

receive a signal from the flywheel velocity sensor indicative of the angular velocity of the flywheel; and send a control signal to the IVT actuator to disengage the infinitely variable transmission from the flywheel when the velocity of the rim is zero or the velocity of the flywheel is zero.

* * * * *